United States Patent [19]

Gross

[11] 4,340,557
[45] Jul. 20, 1982

[54] METHOD OF MAKING UNFESTOONED PLASTIC CONTAINERS FROM POLYGONAL BLANKS

[75] Inventor: Robert M. Gross, Muncie, Ind.

[73] Assignee: Ball Corporation, Muncie, Ind.

[21] Appl. No.: 216,747

[22] Filed: Dec. 16, 1980

[51] Int. Cl.³ ............................................. B29D 23/10
[52] U.S. Cl. ..................................... 264/146; 264/148; 264/151; 264/160; 264/163; 264/296; 264/320
[58] Field of Search ............... 264/148, 146, 151, 163, 264/320, 322, 160, 296; 425/451.9

[56] References Cited

U.S. PATENT DOCUMENTS

| | | | |
|---|---|---|---|
| 3,532,786 | 10/1970 | Coffman | 264/320 |
| 3,562,383 | 2/1971 | Ayres | 264/320 |
| 3,622,418 | 11/1971 | Black et al. | 264/151 |
| 3,739,052 | 6/1973 | Ayres et al. | 264/322 |
| 3,824,761 | 7/1974 | Wright | 264/151 |
| 3,947,204 | 3/1976 | Ayres et al. | 425/451.9 |
| 4,005,967 | 2/1977 | Ayres et al. | 425/451.9 |
| 4,014,970 | 3/1977 | Jahnle | 264/163 |

*Primary Examiner*—Jeffery R. Thurlow
*Attorney, Agent, or Firm*—Gilbert E. Alberding

[57] ABSTRACT

A method is disclosed for substantially removing surface defects that are attendant with plastic blanks formed by cutting out squares from sheet stock material that are subsequently forged by means of non-melt, high pressure or solid-phase forming of preforms and thereafter thermoforming said preforms into containers. The blank itself comprises a tabular body having a pair of major faces located substantially parallel to one another, minor faces integrally formed and extending outwardly from said major faces, said minor faces presenting a smooth surface commensurate to that of said major faces, and a vertical portion integrally formed with said minor faces and defining an outer peripheral band or line having an unsmooth surface. A method of forming said plastic blank comprises providing a sheet of polymeric material, pressing lines of demarkation upon said sheet, severing said sheet within said lines to separate and cut said sheet into individual blank, whereby each blank is formed having a smooth surface provided by said pressing step and a rough surface provided by said severing step, thereafter forging said blank to a predetermined preform and reforming said preform to a container free of any imperfection.

18 Claims, 13 Drawing Figures

METHOD OF MAKING UNFESTOONED PLASTIC CONTAINERS FROM POLYGONAL BLANKS

TECHNICAL FIELD

This invention relates to a plastic structure of novel configuration and relates, more particularly, to a plastic blank having an improved unitary configuration that is readily deformable into an open-mouth container. The plastic structure is further characterized by being made from orientable polymeric material either of a single layer or comprising a number of layers of different polymeric materials.

BACKGROUND OF THE PRIOR ART

The subject invention is an improvement over the prior art plastic blank configurations that are used in making open-mouth containers. It is known that sundry thermoplastic containers can be made by high-speed, solid-phase processes wherein a thermoplastic blank is worked under certain conditions of high pressure at non-melt temperatures into a preform configuration and then reformed by a thermoforming step into a container to produce a desired container shape having advantageous properties heretofore unobtainable by conventional thermoforming processes. Prior to these methods it was well-known that plastic preforms could be injection molded from molten polymers and later thermoformed into thermoplastic containers, as shown, for example, in U.S. Pat. Nos. 3,305,158 and 3,488,805. Admittedly, injection molding techniques have certain limitations, require relatively expensive equipment, and any preform and subsequent container formed therefrom does not have certain advantageous properties as would be found in a container produced by non-melt, solid-phase techniques.

In effect, the apparent shortcomings of injection molding techniques made high-speed, solid-phase methods more attractive. One non-melt method advocated by the Shell Oil Company employs solid-phase forming and is disclosed in U.S. Pat. No. 3,532,786, to Coffman and U.S. Pat. Nos. 3,499,188; 3,546,746 and 3,757,718 to Johnson. Another non-melt method advanced by The Budd Company for solid-state forming is described in U.S. Pat. No. 4,014,970 to Jahnle. Another non-melt process is described and is referred to as a scrapless forming process, the process being advanced by the Dow Chemical Company and described in U.S. Pat. Nos. 3,739,052; 3,947,204; 3,995,763; and 4,005,967 to Ayres, et al. In these prior art processes a plastic blank is cut from sheet stock material, the blank being approximately equal in weight to the finished plastic container, and processed by high pressure techniques to form said desired container. In general, the blanks in the form of squares are cut in line from extruded single or multilayered sheet by slitting the sheet in the direction of extrusion and then shearing the resulting ribbons. In the scrapless forming process the thus-cut squares or blanks are lubricated by conventional means and the lubricated blanks are placed into a heating oven whereby they are heated to a temperature above the softening point yet below the melting point of the polymeric material. For example, polystyrene is heated to temperature between about 230° to about 280° F., whereas high density polyethylene and polypropylene require a narrower range, the temperature being below the crystalline melting point. When the blanks are at the proper forming temperature, they are loaded into a forming machine, the forming machine having a heated circular mold for solid-phase forming the blanks into preforms. The heated circular mold itself has a center portion maintained at a forming temperature while the peripheral portion of the mold is generally below the softening point of the plastic material. Thus, the blanks are preheated to a temperature ranging from just below the melting point to within a softening range of the material and immediately solid-phase formed or forged in a heated mold into a circular preform. In this way orientation is partially built into the finished container depending on a number of factors including the polymer employed, the extent of forging, the pressure, temperature of forging of the preform at this initial stage. The orientation is brought about since a blank of polymeric material is substantially a volume of unoriented polymer which when subjected to external stress undergoes a rearrangement of the crystalline material, generally in the direction of applied stress. It will be appreciated that a high degree of orientation can be obtained if the blank is forged at a forging temperature a little below the melting point yet above the softening point of the blank itself. In accordance with the scrapless forming process a blank is forged in the forming step by forging means provided with cooled lip forming means whereby the high forging pressure applied is sufficient to cause the plastic blank to flow uniformly outwardly and into the lip forming means to cause the peripheral part of the forged blank to be brought rapidly below the softening point of said material while the center portion is maintained at its forming temperature. This process gives rise to the preform formation which is subsequently indexed to a thermoforming station for the next step of making the desired container.

In the above described preform forming step of the scrapless forming process it has been found that the cut edge portion of a conventional blank exhibits a failing that is carried over into the finished product in that during the forging step where the cut edge portion is brought radially outwardly, it manifests itself upon the finished product as an apparent blemish or surface phenomenon in the form of festoons or scalloped markings. This blemish is unpleasing to the eye, may present a structural defect so that a closure could not be properly seated to seal the container and, therefore, would not be acceptable in a commercial sense. Seemingly, the rheological flow pattern is such that during the forging step the peripheral surface which has been sheared or cut is forced towards the lid ring and becomes in part or in total a structural fault in the sidewall and/or upper rim or flange portions of the container. It will be appreciated that the distance to be traveled by a forged plastic blank material is at its greatest at the midpoints from the corners of a given blank and it is along these loci from these midpoints that the apparent structural imperfection would be at its maximum. Lubrication alone has not resolved this problem in that this manifestation is apparently dependent upon direction of molecular orientation to some extent and simply upon, to a greater degree, the roughened or unsmooth surface established during the severing or cutting stage in the blank forming stage. Different cutting means have been used to better sever the sheet in order to remove these blemishes from a finished product. Attempts have been made to cut or sever from a given thempoplastic sheet other configurations, such as hexagonal and the like to provide less plug travel distance during the solid-phase forming in order to reduce these blemish marks or invected manifestations. All these attempts have not been too successful in removing or substantially removing the surface imperfections or blemish marks from the finished container.

A method of reducing imperfections associated with edge cracking and the like for acrylic blanks when subjected to compression forces is taught in U.S. Pat. No. 3,562,383 to Ayres. The patentee discloses that in order to avoid edge cracking the acrylic blank should be provided with a continuous groove along the peripheral edge of the blank, the groove assuming a V- or U-shaped configuration in cross section. Although related in some aspects to the patent of Ayres the subject invention differs in resolving a different problem and employing different structural features for the polymeric blank configuration.

The present invention is a result of the discovery that when a blank of thermoplastic material has a particular configuration, especially the outer edge portions of the blank, the aforementioned imperfections are removed. Therefore, a major object of this invention is to provide the art with a container having no blemishes or irregular edge manifestations proximate the open mouth of the container, the blemishes taking on a more or less a scalloped or festooned appearance.

Another object of this invention is to provide the art with eliminating the festooned or scalloped appearance in finished containers, and therefore to render festooned-free plastic container, both monolithic and multilayered types, said containers having been formed by providing cut-out blanks which are generally polygonal in shape, forming circular preforms from said blanks that were polygonal in shape, and thereafter forming said containers from said circular preforms.

Another object of this invention is to provide a uniform container free of any festooning or invection caused by roughened portions of thermoplastic blanks formed by the scrapless forming processes.

Another object of this invention is to provide a container made by high pressure, non-melt temperature scrapless forming process that is essentially free from surface imperfections attendant with uneven, peripheral surfaces of a plastic blank cutout.

Another object of the subject invention is the aspect of providing a specially contoured blank of thermoplastic material that can readily be uniformly formed by solid-state forming techniques into a preform that has virtually no surface imperfections associated with flange and sidewall formation.

These and other objects of the invention will become more readily apparent from review of the specification, claims and a study of the attached drawings.

BRIEF SUMMARY OF THE INVENTION

According to the present invention, a method is described for preventing festooning of a plastic container produced by a scrapless forming process comprising forming a thermoplastic sheet into stock material, impressing transitional zones into said material, severing within said zones to divide and separate said material into individual blanks, each blank having smooth surfaces provided by said impressing step and essentially unsmooth surfaces provided by said severing step, thereafter forging said blank to form a preform and thereafter forming said preform into a finished container.

From another aspect the subject invention relates to a novel article of manufacture, said article comprising a polymeric tabular body having a pair of major faces located parallel to one another, minor faces integrally formed and extending outwardly from said major faces, said minor faces presenting a smooth surface commensurate to that of said major faces, and an edge portion integrally formed with said minor faces and defining an outer peripheral band or line having an unsmooth surface.

The term "sheet material" refers to the polymeric material produced by extrusion or coextrusion processes. The term "blank" or "chip" refers to the cut out or severed configuration produced from the sheet material. The term "preform" refers to a blank or chip that has been subjected to solid-phase or nonmelt, high pressure forming. It should be mentioned that since varied and various thermoplastic materials may be used herein, it is obvious that terms such as "forging temperature," "softening point," "melting point," and "thermoforming temperature" are relative terms and cannot be defined specifically without considering the characteristics of each polymeric employed. Further, multilayered structures will have different forging temperatures, softening points, melting points, etc., than their individual polymeric layers.

DETAILED DESCRIPTION OF THE INVENTION

Figure 1:
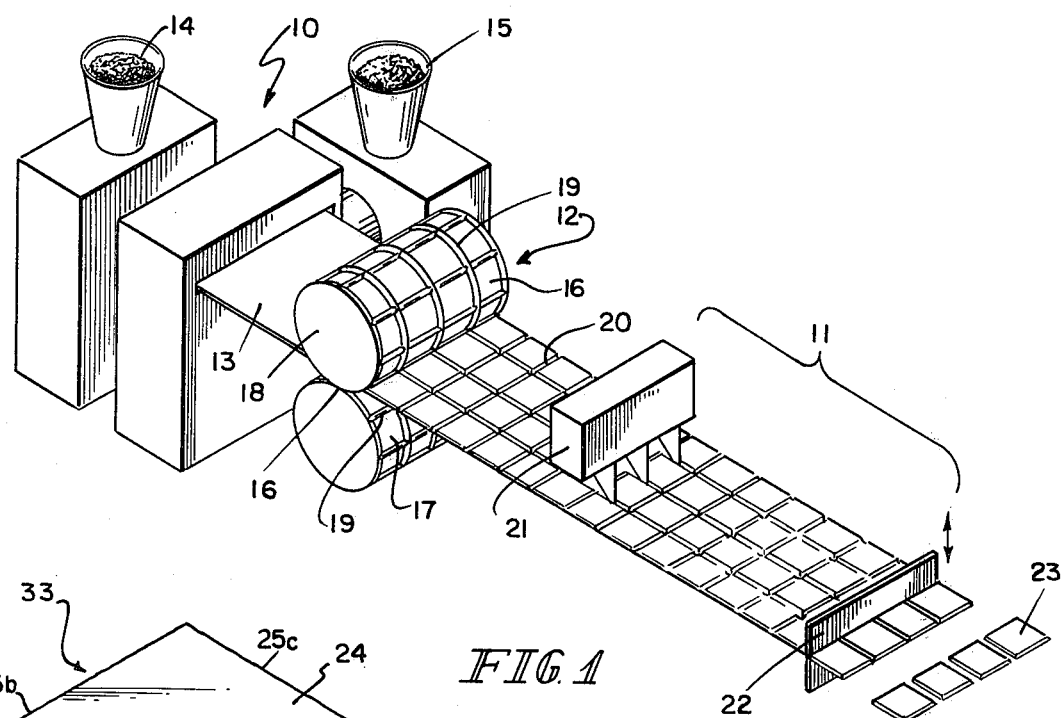
FIG. 1 is a perspective view of the impressing and cutting means that may be employed in the forming of plastic blanks in accordance with this invention.

Referring now to the drawings and, in particular, to FIG. 1, an extrusion apparatus 10 and a slitting and cutting device 11 are shown having intermediate said apparatus 10 and device 11 an impressing roll means 12. The extrusion apparatus 10 is a conventional extrusion apparatus for forming stock sheet material 13. It will be appreciated that the sheet material 13 may be formed from one type of polymer placed in the hopper 14 or 15 whereby a monolayer sheet, such as polyethylene, is formed or different polymers may be used to coextrude the same to form a multilayer structure, such as polyethylene-saran-polyethylene. Coextrusion methods to form composite, multilayered sheet are well-known in the art and are described in a number of patents including U.S. Pat. No. 3,557,265 to Chisholm, et al.

The sheet material 13 from the extrusion apparatus 10 is worked and pulled between the nip 16 of a pair of impression rolls 17 and 18, both of which have standing in relief a grid network or ridges 19 that impart a deep groove into the sheet material 13 as the sheet material 13 travels past the nip 16. The sheet material 13 is thus impressed with a network of channels or valleys 20 which in turn are cut through and within said channels 20 by slitter 21 and cutter 22 to form rectangular blanks 23.

To form a preform by conventional means, a blank is used and is generally lubricated and thereafter preheated to a temperature ranging just above the softening point to below the melting point of the material. The thus-heated, lubricated blank is placed onto the lower platen of a specially designed hydraulic press or forging apparatus, such a press being disclosed in U.S. Pat. No. 4,005,967 to Ayres, et al. The hydraulic press is provided with a ram that descends under substantial pressure to forge the plastic blank into a circular cavity between upper and lower platens to produce the preform. The preform is thereafter made into a container by thermoplastic forming means as, for example, set forth said U.S. Pat. No. 4,005,967.

Figure 2:
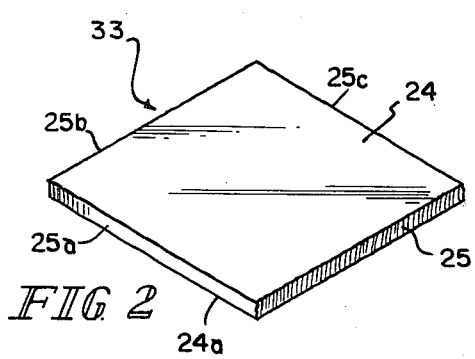
FIG. 2 is a perspective view of a prior art blank or plastic chip formed by conventional processes such as used for scrapless forming methods.

As used in the prior art, a blank 33 is generally in a form as shown in FIG. 2. Such a blank 33 comprises two major surfaces 24 and 24a. Along the sides of blank 33 are peripheral surfaces 25, 25a, 25b and 25c, the surfaces being generally roughened to some degree and lacking in gloss as would be shown by the two major surfaces 24 and 24a. Under microscopic examination the peripheral surfaces 25, 25a, 25b and 25c have an uneven or unsmooth appearance due substantially to the cutting means employed to sever and separate the individual blanks 33.

Figure 3:
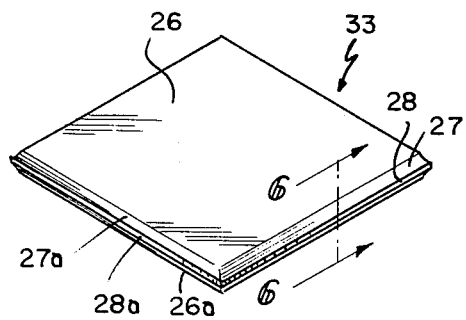
FIG. 3 is a perspective view of an unforged, rectangular blank showing one form of a peripheral configuration in accordance with the instant invention.
Figure 4:
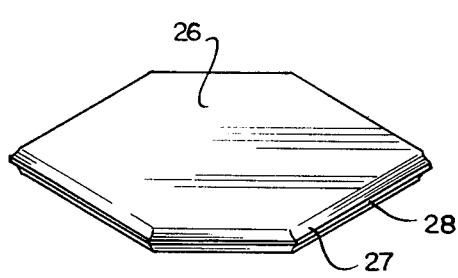
FIG. 4 is a perspective view of an unforged, hexagonal blank showing a peripheral edge portion in accordance with the subject invention.

When a blank is formed in accordance with the subject invention it conforms to a polygonal form as depicted, for example, in FIG. 3 wherein the major surfaces 26, 26a are smooth as would be produced from conventional extrusion methods along with transitional surfaces 27, 27a, etc., with peripheral surfaces 28, 28a, etc. It will be appreciated that the blank produced in accordance with this invention will be provided with a smooth glossy-like transitional surface 27, said smoothness and luster being equal or substantially equivalent to that of the adjacent or major surfaces 26. Moreover, the peripheral surfaces 28 are now substantially reduced and minimized over that observed in a prior art blank, FIG. 2.

Figure 6:
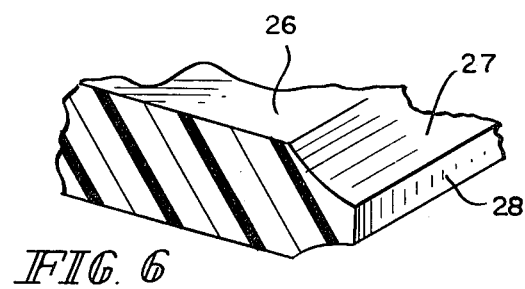
FIG. 6 is a sectional view of an unforged plastic blank taken along the lines 6—6 of FIG. 3.
Figure 7:
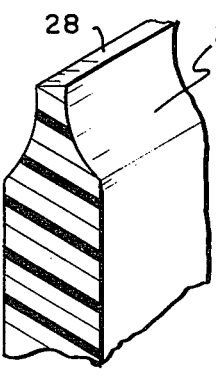
FIGS. 7, 8, 9 and 10 are further sectional views of peripheral portions of plastic blanks having variously shaped and positioned tapered or curved surfaces in accordance with the instant invention.
Figure 8:
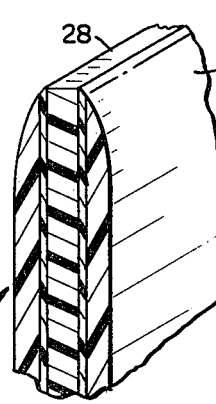
Figure 9:
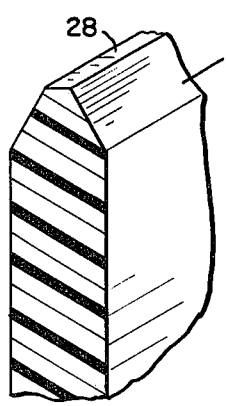
Figure 10:
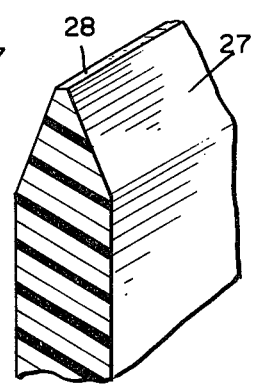

A cross-sectional view along lines 6—6 of FIG. 3 is shown in FIG. 6 wherein the major surfaces 26 are shown along with the transitional portions 27 and peripheral surface 28.

Figure 5:
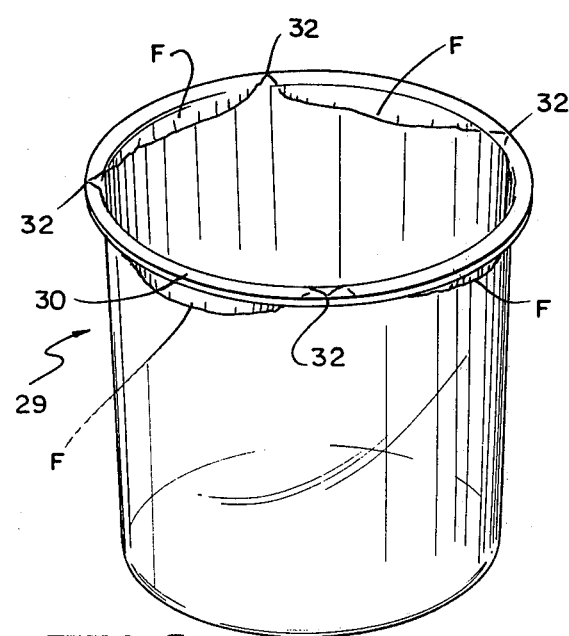
FIG. 5 is a plastic container showing the so-called festooning effect that is typically formed in accordance with the prior art.

FIG. 5 depicts a plastic container 29 formed by a conventional plastic blank such as shown in FIG. 2 using non-melt, high pressure methods such as disclosed in U.S. Pat. No. 4,005,967 to Ayres, et al. It is noted that container 29 has a substantial blemish that curves or loops upwards and downwards about the container rim 30, the curved or looped areas F making, in this case, four contact points 32 with the rim 30 corresponding with the four corners of a conventional square plastic blank, FIG. 2. The festooned appearance presents a surface blemish or imperfection in the plastic container that is generally commercially unacceptable or at least unpleasing to the eye.

The particular configuration for the plastic blank of the subject invention allows, it is believed, a smooth profile to be presented to the forging dies during the non-melt, high pressure forming of the preform and this, in turn, allows a container to be formed that is free of surface imperfections or festooning associated with prior art methods. In this regard the structure of the blank is critical in that it presents a smooth transitional portion between the major faces and the peripheral edge. A number of different configurations having different cross-sectional perimeters may be used, FIGS. 7-10 depicting some of these preferred embodiments.

The plastic blanks of this invention may be constructed of various materials. In particular, the invention is applicable to the use of a single plastic such as polyolefin, including polyethylene, polypropylene, etc., and polyvinyl aromatics such as polyesters, polystyrenes as well as polyvinyl halides such as polyvinyl chlorides. Moreover, an essential aspect of the subject invention is the structural features of the preform itself, in that it readily is formable into multilayered articles, including open-mouth containers. For example, a multilayered material may consist of polyvinyl aromatics such as styrene, polyvinyl toluene, or rubber modified blends thereof with a core of polyvinylidene chloride. A further useful layer may consist of polyethylene or polypropylene with a core of polyvinylidene chloride. Containers formed with a polyvinylidene chloride layer are excellent barriers to gases such as oxygen, carbon dioxide and the like.

It will be appreciated form the polymeric materials used and the conditions under which the preform is formed that a considerable degree of orientation is built into a given container through the non-melt, high pressure forging of the preform. In a like manner when a preform is forged below the softening point of a blank, a high degree of orientation is formed in the container.

Clear, transparent and translucent, polymeric materials may result from forming the containers herein disclosed. Molecular orientation plays a major role. A blank having no orientation will form a container that is generally opaque. Nevertheless, such containers have some strength and stress crack resistance due to orientation resulting from the combined forging and thermoforming steps. For blanks having a moderate degree of orientation already in the blank a transparent to translucent container often results and the resulting containers formed thereby have, inter alia, improved strength and stress crack resistance.

Physical as well as optical properties are influenced by molecular orientation. For example, the optical clarity for oriented polypropylene in the visible spectrum approaches that of glass. This may be explained in that when a polymer mass is crystallized in the absence of external forces, there is no preferred direction along which the polymer chains lie. However, when such a mass of unoriented crystalline polymer is subjected to external stress the mass undergoes a rearrangement of the crystalline materials. In this way orientation is produced by stress, the stress being created by various means including extruding, forging, calendaring and the like. Orientation is established from the fact that the polymer mass becomes to some degree optically anesotropic. It should be pointed out that the presence of crystallinity is not essential for obtaining molecular orientation. For example, polystyrene which does not crystallize undergoes substantial orientation when subjected to stress as observed in an injection molding process. The degree of orientation is often difficult to determine. Changes in the x-ray diffraction pattern suggest that polymer chains align in the direction of applied stress. From the distribution of scattered intensity in the arcs or spots of such a pattern, the degree of orientation can be ascertained in terms of distribution functions. Further, birefringence, the change in the index of refraction with direction, is evidenced in a polymeric material by the ability of such materials to rotate the plane of polarized light. It is known that upon orientation there is an increase in birefringence. In the case of polystyrene there is an apparent increase in birefringence upon merely injection molding the polymer.

Figure 11:
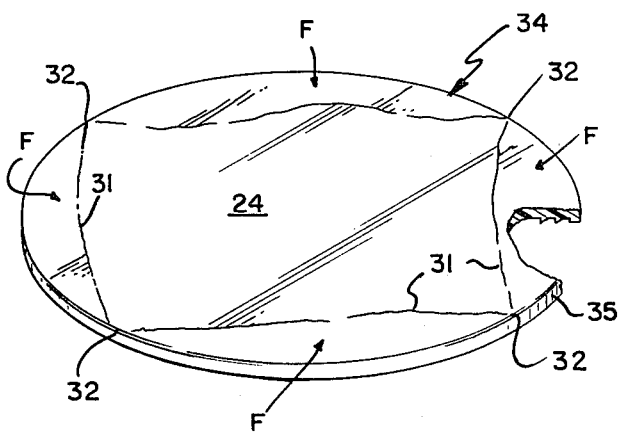
FIG. 11 is a perspective view of a plastic preform of the prior art.

FIG. 11 depicts a preform of the prior art that may or may not have molecular orientation depending on the polymeric material but does show a festooning effect F present in a prior art blank. As discussed above, this effect or irregularity is later manifested into the container sidewall as shown for example in FIG. 5. Aside from the finished rim portion 35 of the preform 34, the festooned areas F, as well as the points 32 and line 31 correspond to those shown for the finished container 29.

Figure 12:
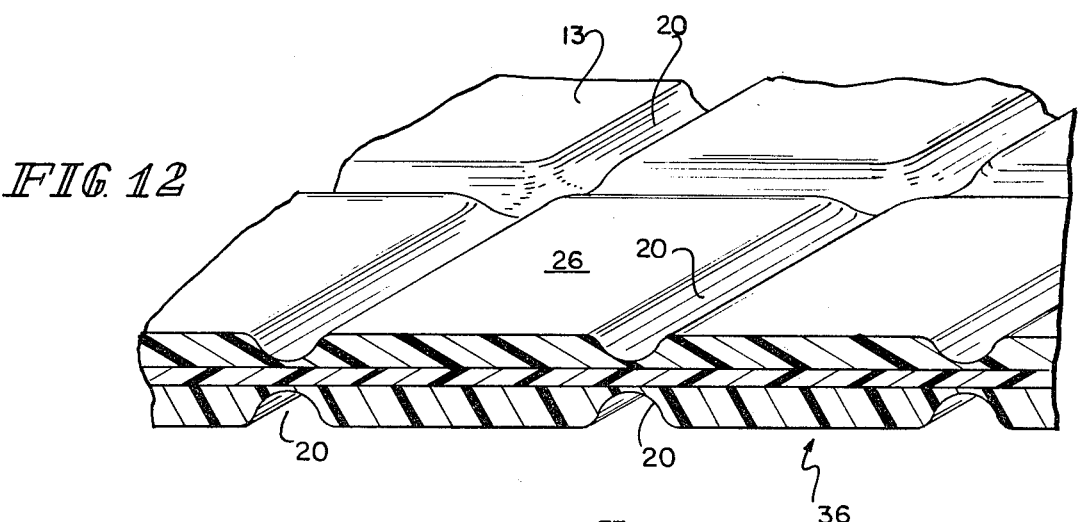
FIG. 12 is a view of an impressed polymeric sheet stock prior to cutting, the view showing the groove network of the sheet.
Figure 13:
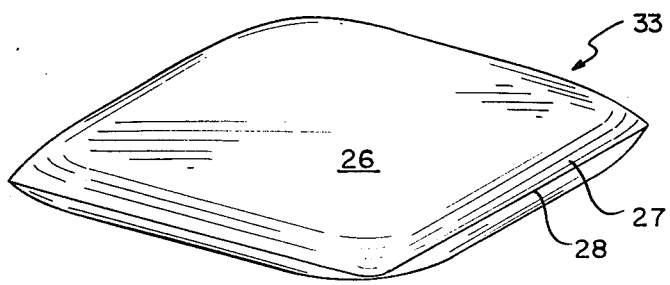
FIG. 13 is a preferred polymeric blank structure that is essentially edgeless.

FIG. 12 depicts a multilayered structure that has been impressed but not yet cut. It will be appreciated that the channels or grooves 20 impressed into the stock material may be done by an conventional means such as rollers, grid plates and the like. One preferred embodiment for a polymeric blank is merely a gradual tapering together or converging of the major surfaces so that the blank, aside from the peripheral line of detachment or severance between adjacent blanks, is essentially an edgeless structure. An edgeless blank, a preferred embodiment herein, is shown in FIG. 13. It has been observed that blanks with sharp edges often carry these edges to the finished container in the form of very fine, curved lines after the fashion already discussed.

Although the polymeric blanks herein contemplated may be tabular structures, it will be appreciated that contoured or curvilinear structures are also contemplated. Further, the blanks may be cylindrical in shape as would be utilized in the formation of molecularly oriented containers from curved polymeric materials, whether monolayered or multilayered. In this regard hollow, elongated structures such as tubular blanks are contemplated herein such tubular structures being cut or severed from a longer extruded tube and being provided with at least one transitional surface circumferentially disposed intermediate between the major inner and outer surfaces and the line or band of severance, the transitional surface presenting a smooth surface commensurate in gloss to the major surfaces.

The impression step may be carried out in conjunction with the severing set or as separate steps. Thus, the formation of grooves or valleys in a patterned network may be done concurrent with the separation of the individual blank or done serially as set forth herein. Furthermore, the impression means may be simply a cold rolling or stamping process or, on the other hand, the impression means may be heated to expedite the channeling process.

The separation of the polymeric material into individual blanks may be carried out in practice by cutting devices known in the art such as band and circular saws, hot cutting filaments and wires and the like. It will be appreciated that in the drawings herein, many conventional parts such as heaters, temperature controllers, frames, cooling channels, and the like have been omitted for the purpose of simplicity, but their inclusion is understood by those skilled in the art and within the scope of the invention.

Articles such as plastic wide-mouth containers, bottles, etc., formed in accordance with the subject invention of polymeric materials, whether monolayered or polylayered material, have unique properties which in turn enables the articles to be used for many purposes in the art. Such properties include among others molecular orientation, tensile impact strength, modulus of elasticity in flexure, and plastic memory effect whereby upon application of evaluated heat the article shrinks and reverts to a formation corresponding to the original polymeric blank from which said article was formed.

While specific embodiments of the invention have been shown and described in detail to illustrate the application of the inventive principles, it will be understood that the invention may be embodied otherwise.

What is claimed is:

1. A method of preventing festooning effect on a container produced by scrapless forming process comprising providing a thermoplastic sheet material, impressing surface grooves on said sheet material, severing within said grooves to separate said sheet material into individual blanks, each blank having sufficient material to form a container, each blank having a pair of major faces located substantially parallel to one another and having a minor surface provided by said impressing step, said minor surface extending outwardly from said major faces and presenting a smooth surface commensurate to that of said major faces and an essentially unsmooth surface provided by said severing step, thereafter forging said blank in a forging mold heated to a temperature at least as high as the softening temperature of the thermoplastic material of said blank to form a preform, and forming said preform into a container.

2. A method of claim 1 wherein the sheet material is severed into polygonal-shaped blanks.

3. A method of claim 1 wherein the sheet material severed into rectangular-shaped blanks.

4. A method of claim 1 wherein the sheet material is severed into hexagonal-shaped blanks.

5. A method of claim 1 wherein the thermoplastic sheet material is monolayered.

6. A method of claim 5 wherein the monolayered sheet comprises a polyolefin.

7. A method of claim 6 wherein the polyolefin is polyethylene or polyproplylene.

8. A method of claim 5 wherein the sheet material is polystyrene.

9. A method of claim 1 wherein the sheet material is multilayered.

10. A method of claim 9 wherein one of the layers of the multilayered sheet is an oxygen-barrier layer.

11. A method of controlling a festooning effect on plastic containers produced from non-melt, high-pressure methods, said method comprising providing a sheet of polymeric material, pressing surface grooves of demarkation upon said polymeric sheet, severing said sheet within said surface grooves to separate and cut said sheet into individual plastic blanks, whereby each blank is formed having an outwardly extending smooth surface provided by said pressing step and a rough surface defining a peripheral edge of said blank provided by said severing step, and thereafter forging said blank to a predetermined form and finally forming said form to a container free of a festoon effect.

12. A method of claim 11 wherein the sheet is monolayered.

13. A method of claim 12 wherein the monolayered sheet comprises a polyolefin.

14. A method of claim 13 wherein the polyolefin is polyethylene or polypropylene.

15. A method of claim 11 wherein the sheet is a multilayered sheet.

16. A method of claim 15 wherein the multilayered sheet includes an oxygen-barrier layer.

17. A method of claim 16 wherein the oxygen-barrier layer includes polyvinylidene chloride.

18. A method of preventing blemishes consisting of festooned markings on a plastic circular preform formed from a polygonal blank comprising forging in a circular mold at high pressures and below the melting temperature a polygonal blank having a first and a second major surface, said major surfaces being substantially parallel, at least one peripheral surface extending outwardly and downwardly from said first and second major surfaces, said peripheral surface defining a smooth transitional portion and terminating in a vertical edge of said blank having an unsmooth portion whereby upon high pressure forging thereof said polygonal blank allows its smooth transitional portion to advance radially outwardly within the confines of said circular mold thereby preventing festooned markings on said plastic circular preform.

* * * * *